United States Patent
Kim et al.

(10) Patent No.: US 10,779,139 B2
(45) Date of Patent: Sep. 15, 2020

(54) METHOD AND DEVICE FOR INTER-VEHICLE COMMUNICATION VIA RADAR SYSTEM

(71) Applicant: Stradvision, Inc., Pohang-si, Gyeongsangbuk-do (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 16/731,953

(22) Filed: Dec. 31, 2019

(65) Prior Publication Data
US 2020/0252770 A1 Aug. 6, 2020

Related U.S. Application Data

(60) Provisional application No. 62/799,193, filed on Jan. 31, 2019.

(51) Int. Cl.
*H04W 4/46* (2018.01)
*G05D 1/00* (2006.01)
(Continued)

(52) U.S. Cl.
CPC ............ *H04W 4/46* (2018.02); *G01S 13/931* (2013.01); *G05D 1/0022* (2013.01); *G01S 2013/9316* (2020.01)

(58) Field of Classification Search
CPC ..................................................... G01S 7/006
See application file for complete search history.

(56) References Cited

U.S. PATENT DOCUMENTS

| 7,418,346 B2 * | 8/2008 | Breed | G01S 13/931 701/301 |
| 7,629,899 B2 * | 12/2009 | Breed | G01S 13/931 340/903 |

(Continued)

FOREIGN PATENT DOCUMENTS

DE 102009054776 A1 * 8/2010 ........... G01S 13/931

*Primary Examiner* — Bernarr E Gregory
(74) *Attorney, Agent, or Firm* — Kaplan Breyer Schwarz, LLP (57) ABSTRACT

A method for a V2V communication by using a radar module used for detecting objects nearby is provided. And the method includes steps of: (a) a computing device performing (i) a process of instructing the radar module to transmit 1-st transmitting signals by referring to at least one 1-st schedule and (ii) a process of generating RVA information by using (1-1)-st receiving signals, corresponding to the 1-st transmitting signals; and (b) the computing device performing a process of instructing the radar module to transmit 2-nd transmitting signals by referring to at least one 2-nd schedule.

20 Claims, 4 Drawing Sheets

(51) Int. Cl.
    *G01S 13/931*    (2020.01)
    *G01S 13/00*    (2006.01)

(56) References Cited

U.S. PATENT DOCUMENTS

| | | | | |
|---|---|---|---|---|
| 7,899,621 | B2 * | 3/2011 | Breed | G01S 13/931 |
| | | | | 701/301 |
| 8,520,695 | B1 * | 8/2013 | Rubin | H04W 4/46 |
| | | | | 370/445 |
| 8,730,088 | B2 * | 5/2014 | Milligan et al. | G01S 7/006 |
| | | | | 342/57 |
| 8,965,677 | B2 * | 2/2015 | Breed | G01S 13/931 |
| | | | | 701/301 |
| 9,465,105 | B2 * | 10/2016 | Park | G01S 13/931 |
| 10,094,933 | B1 * | 10/2018 | Ozbilgin | G01S 17/931 |
| 10,098,175 | B2 * | 10/2018 | Kremo | H04W 4/46 |
| 10,272,927 | B2 * | 4/2019 | Mahnke | G01S 13/931 |
| 2008/0040023 | A1 * | 2/2008 | Breed | G01S 13/931 |
| | | | | 701/117 |
| 2010/0198513 | A1 * | 8/2010 | Zeng | G01S 13/931 |
| | | | | 701/300 |
| 2012/0323474 | A1 * | 12/2012 | Breed | G01S 13/931 |
| | | | | 701/117 |
| 2013/0279392 | A1 * | 10/2013 | Rubin | H04W 4/46 |
| | | | | 370/312 |
| 2015/0360611 | A1 * | 12/2015 | Cherkaoui | G01S 13/931 |
| | | | | 340/436 |
| 2016/0223643 | A1 * | 8/2016 | Li | G01S 13/931 |

* cited by examiner

METHOD AND DEVICE FOR INTER-VEHICLE COMMUNICATION VIA RADAR SYSTEM

CROSS REFERENCE OF RELATED APPLICATION

This present application claims the benefit of the earlier filing date of provisional patent application No. 62/799,193, filed Jan. 31, 2019, the entire contents of which being incorporated herein by reference.

FIELD OF THE DISCLOSURE

The present disclosure relates to a method and a device for use with an autonomous vehicle; and more particularly, to the method and the device for V2V communication by using pre-installed radar system.

BACKGROUND OF THE DISCLOSURE

The V2X communication has recently attracted great attention with autonomous driving technology. The V2X is an abbreviation of "Vehicle to Everything", and the V2X communication may be performed between at least one autonomous vehicle and at least one object. As an example of the V2X, Vehicle-to-Vehicle (V2V) communication may be performed among the vehicles, especially. Since the vehicles are the most significant part on the road, the V2V communication is considered as the most significant communication among the V2X communication.

However, there is a problem in the V2V communication. The V2V communication may require at least one additional communication module in the vehicles. Thus, there may be additional cost for installing the additional communication module, which may be a burden for the owners of the vehicles.

SUMMARY OF THE DISCLOSURE

It is an object of the present disclosure to solve all the aforementioned problems.

It is another object of the present disclosure to provide a method for V2V communication through at least one radar system using FMCW signals without additional cost.

It is still another object of the present disclosure to allow the radar system to perform the V2V communication while performing its original functions, by transmitting different signals according to time slots.

It is still yet another object of the present disclosure to establish the V2V communication by allowing each of vehicles to share its own circumstance information with other vehicles, using prescribed data permutations.

In accordance with one aspect of the present disclosure, there is provided a method for a V2V communication by using a radar module used for detecting objects nearby, including steps of: (a) a computing device, if a 1-st trigger that a 1-st timing corresponding to a current time is included in a 1-st time slot is detected, performing (i) a process of instructing the radar module to transmit one or more 1-st transmitting signals, to be used for acquiring RVA information on at least part of one or more head directions, one or more relative locations and one or more relative velocities of at least part of one or more 1-st surrounding objects including one or more 1-st surrounding vehicles located closer than a first threshold from a subject vehicle interworking with the computing device at the 1-st timing, by referring to at least one 1-st schedule and (ii) a process of generating the RVA information by using one or more (1-1)-st receiving signals, corresponding to the 1-st transmitting signals, acquired through the radar module; and (b) the computing device, if a 2-nd trigger that a 2-nd timing corresponding to a later time from the 1-st timing is included in a 2-nd time slot is detected, performing a process of instructing the radar module to transmit one or more 2-nd transmitting signals by referring to at least one 2-nd schedule, corresponding to V2V transmitting information on the subject vehicle.

As one example, at the step of (a), the computing device, if one or more (1-2)-nd receiving signals are acquired through the radar module from at least part of the 1-st surrounding objects, further performs a process of generating 1-st V2V receiving information by referring to the (1-2)-nd receiving signals in parallel with the other processes performed during the step of (a), and wherein, at the step of (b), the computing device, if one or more 2-nd receiving signals are acquired through the radar module from at least part of 2-nd surrounding vehicles which are located closer than the first threshold from the subject vehicle at the 2-nd timing, performs a process of generating 2-nd V2V receiving information on at least part of the 2-nd surrounding vehicles by referring to the 2-nd receiving signals in parallel with the other process performed during the step of (b).

As one example, at the step of (a), the computing device (i) detects at least one starting signal and at least one ending signal among the (1-2)-nd receiving signals by referring to a reference length included in a communication rule of the V2V communication, (ii) generates at least one meta data permutation including at least part of the (1-2)-nd receiving signals between the starting signal and the ending signal, and then (iii) generates the 1-st V2V receiving information by referring to the meta data permutation.

As one example, at the step of (a), the computing device, if a time gap between receiving timings of its two inputted receiving signals is smaller than a second threshold and thus if the inputted receiving signals are not determined as being included in the (1-1)-st receiving signals or as being included in the (1-2)-nd receiving signals, instructs the radar module to continuously receive receiving signals until the meta data permutation is generated.

As one example, at the step of (a), the computing device compares the meta data permutation and each of one or more reference data permutations corresponding to each of driving circumstances, to find a specific reference data permutation whose similarity score with the meta data permutation is larger than a third threshold, to thereby generate the 1-st V2V receiving information by referring to information on a specific driving circumstance corresponding to the specific reference data permutation.

As one example, at the step of (a), the computing device generates 1-st circumstance information on at least part of the 1-st surrounding vehicles by referring to the 1-st V2V receiving information, to thereby support an autonomous driving of the subject vehicle by referring to the 1-st circumstance information, and wherein, at the step of (b), the computing device generates 2-nd circumstance information on at least part of the 2-nd surrounding vehicles by referring to the 2-nd V2V receiving information, to thereby support the autonomous driving of the subject vehicle by referring to the 2-nd circumstance information, wherein (2-1)-st circumstance information among the 2-nd circumstance information is acquired by updating at least part of the 1-st circumstance information on one or more specific vehicles included in both of the 1-st surrounding vehicles and the 2-nd surrounding vehicles, using at least part of the 2-nd V2V receiving information thereon, and wherein (2-2)-nd circumstance information on another vehicles among the 2-nd surrounding vehicles other than the specific vehicles is acquired by another part of the 2-nd V2V receiving information.

As one example, at the step of (b), the computing device transmits the 2-nd transmitting signals with its transmitting timings determined by referring to the 2-nd schedule to thereby deliver the V2V transmitting information to at least part of the 2-nd surrounding vehicles, wherein the 2-nd schedule has been acquired by referring to a specific reference data permutation corresponding to the V2V transmitting information among each of one or more reference data permutations for each of driving circumstances and a reference length included in a communication rule of the V2V communication.

As one example, at the step of (a), the computing device, if a time gap between receiving timings of its two inputted receiving signals is larger than or same as a second threshold, (i) generates Intermediate Frequency (IF) signals between one of the 1-st transmitting signals and said inputted receiving signals, (ii) determines whether each of center frequencies of each of the IF signals is included in a 1-st frequency range or is included in a 2-nd frequency range, to thereby determine whether each of said inputted receiving signals is included in the (1-1)-st receiving signals or the (1-2)-nd receiving signals.

As one example, the computing device uses a frequency interference prevention filter to acquire the (1-1)-st receiving signals and the (1-2)-nd receiving signals at a timing included in the 1-st time slot, and wherein the computing device does not use the frequency interference prevention filter to acquire the 2-nd receiving signals at a timing included in the 2-nd time slot.

As one example, at the step of (a), as the computing device instructs the radar module to transmit the 1-st transmitting signals built as chirp signals, the computing device (i) acquires the (1-1)-st receiving signals, which are reflected signals of the 1-st transmitting signals, through the radar module, (ii) generates each of one or more Intermediate Frequency (IF) signals between each of the 1-st transmitting signals and each of the (1-1)-st receiving signals, and (iii) generates the RVA information by applying a Fourier transform to the IF signals.

In accordance with still another aspect of the present disclosure, there is provided a computing device for a V2V communication by using a radar module used for detecting objects nearby, including: at least one memory that stores instructions; and at least one processor configured to execute the instructions to perform processes of: (I) if a 1-st trigger that a 1-st timing corresponding to a current time is included in a 1-st time slot is detected, (i) instructing the radar module to transmit one or more 1-st transmitting signals, to be used for acquiring RVA information on at least part of one or more head directions, one or more relative locations and one or more relative velocities of at least part of one or more 1-st surrounding objects including one or more 1-st surrounding vehicles located closer than a first threshold from a subject vehicle interworking with the computing device at the 1-st timing, by referring to at least one 1-st schedule and (ii) generating the RVA information by using one or more (1-1)-st receiving signals, corresponding to the 1-st transmitting signals, acquired through the radar module; and (II) if a 2-nd trigger that a 2-nd timing corresponding to a later time from the 1-st timing is included in a 2-nd time slot is detected, instructing the radar module to transmit one or more 2-nd transmitting signals by referring to at least one 2-nd schedule, corresponding to V2V transmitting information on the subject vehicle.

As one example, at the process of (I), the processor, if one or more (1-2)-nd receiving signals are acquired through the radar module from at least part of the 1-st surrounding objects, further performs a process of generating 1-st V2V receiving information by referring to the (1-2)-nd receiving signals in parallel with the process of (I), and wherein, at the process of (II), the processor, if one or more 2-nd receiving signals are acquired through the radar module from at least part of 2-nd surrounding vehicles which are located closer than the first threshold from the subject vehicle at the 2-nd timing, performs a process of generating 2-nd V2V receiving information on at least part of the 2-nd surrounding vehicles by referring to the 2-nd receiving signals in parallel with the process of (II).

As one example, at the process of (I), the processor (i) detects at least one starting signal and at least one ending signal among the (1-2)-nd receiving signals by referring to a reference length included in a communication rule of the V2V communication, (ii) generates at least one meta data permutation including at least part of the (1-2)-nd receiving signals between the starting signal and the ending signal, and then (iii) generates the 1-st V2V receiving information by referring to the meta data permutation.

As one example, at the process of (I), the processor, if a time gap between receiving timings of its two inputted receiving signals is smaller than a second threshold so that the inputted receiving signals cannot be distinguished as being included in the (1-1)-st receiving signals or the (1-2)-nd receiving signals, instructs the radar module to continuously receive receiving signals until the meta data permutation is generated.

As one example, at the process of (I), the processor compares the meta data permutation and each of one or more reference data permutations corresponding to each of driving circumstances, to find a specific reference data permutation whose similarity score with the meta data permutation is larger than a third threshold, to thereby generate the 1-st V2V receiving information by referring to information on a specific driving circumstance corresponding to the specific reference data permutation.

As one example, at the process of (I), the processor generates 1-st circumstance information on at least part of the 1-st surrounding vehicles by referring to the 1-st V2V receiving information, to thereby support an autonomous driving of the subject vehicle by referring to the 1-st circumstance information, and wherein, at the process of (II), the processor generates 2-nd circumstance information on at least part of the 2-nd surrounding vehicles by referring to the 2-nd V2V receiving information, to thereby support the autonomous driving of the subject vehicle by referring to the 2-nd circumstance information, wherein (2-1)-st circumstance information among the 2-nd circumstance information is acquired by updating at least part of the 1-st circumstance information on one or more specific vehicles included in both of the 1-st surrounding vehicles and the 2-nd surrounding vehicles, using at least part of the 2-nd V2V receiving information thereon, and wherein (2-2)-nd circumstance information on another vehicles among the 2-nd surrounding vehicles other than the specific vehicles is acquired by another part of the 2-nd V2V receiving information.

As one example, at the process of (II), the processor transmits the 2-nd transmitting signals with its transmitting timings determined by referring to the 2-nd schedule to thereby deliver the V2V transmitting information to at least part of the 2-nd surrounding vehicles, wherein the 2-nd schedule has been acquired by referring to a specific reference data permutation corresponding to the V2V transmitting information among each of one or more reference data permutations for each of driving circumstances and a reference length included in a communication rule of the V2V communication.

As one example, at the process of (I), the processor, if a time gap between receiving timings of its two inputted receiving signals is larger than or same as a second threshold, (i) generates Intermediate Frequency (IF) signals between one of the 1-st transmitting signals and said inputted receiving signals, (ii) determines whether each of center frequencies of each of the IF signals is included in a 1-st frequency range or is included in a 2-nd frequency range, to thereby determine whether each of said inputted receiving signals is included in the (1-1)-st receiving signals or the (1-2)-nd receiving signals.

As one example, the processor uses a frequency interference prevention filter to acquire the (1-1)-st receiving signals and the (1-2)-nd receiving signals at a timing included in the 1-st time slot, and wherein the processor does not use the frequency interference prevention filter to acquire the 2-nd receiving signals at a timing included in the 2-nd time slot.

As one example, at the process of (I), as the processor instructs the radar module to transmit the 1-st transmitting signals built as chirp signals, the processor (i) acquires the (1-1)-st receiving signals, which are reflected signals of the 1-st transmitting signals, through the radar module, (ii) generates each of one or more Intermediate Frequency (IF) signals between each of the 1-st transmitting signals and each of the (1-1)-st receiving signals, and (iii) generates the RVA information by applying a Fourier transform to the IF signals.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

Figure 1:
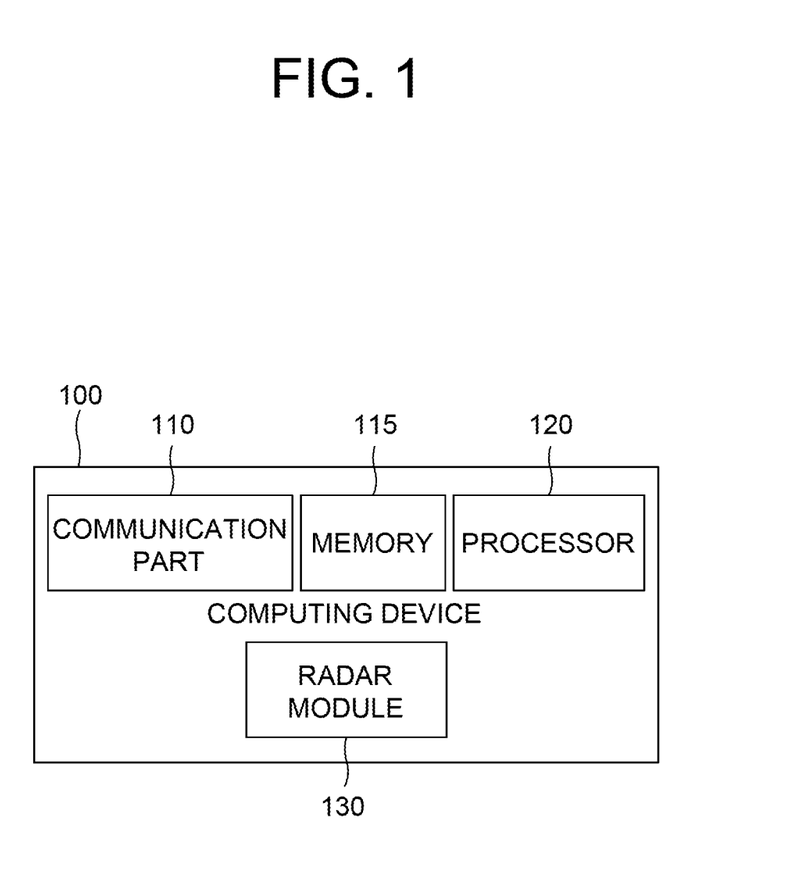
FIG. 1 is a drawing schematically illustrating a configuration of a computing device performing a method for a V2V communication by using a radar module used for detecting objects nearby in accordance with one example embodiment of the present disclosure.

FIG. 1 is a drawing schematically illustrating a configuration of a computing device performing a method for a V2V communication by using a radar module used for detecting objects nearby in accordance with one example embodiment of the present disclosure.

By referring to FIG. 1, the computing device 100 may include at least one radar module 130. Processes of input/output and computation of the radar module 130 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the computing device 100 does not exclude an integrated device including any combination of a processor, a memory, a medium, or any other computing components.

Such computing device 100 may have been installed on a subject vehicle, and the subject vehicle may further include an autonomous driving module, which interworks with the computing device 100, to be used for performing an autonomous driving of the subject vehicle. The autonomous driving module may perform the autonomous driving by referring to RVA information, first circumstance information and second circumstance information to be explained later.

So far the configuration of the computing device 100 to be used for performing the method for the V2V communication by using the radar module 130 used for detecting objects nearby in accordance with one example embodiment of the present disclosure has been explained. Below, the method for the V2V communication itself will be explained, first by referring to FIG. 2.

Figure 2:
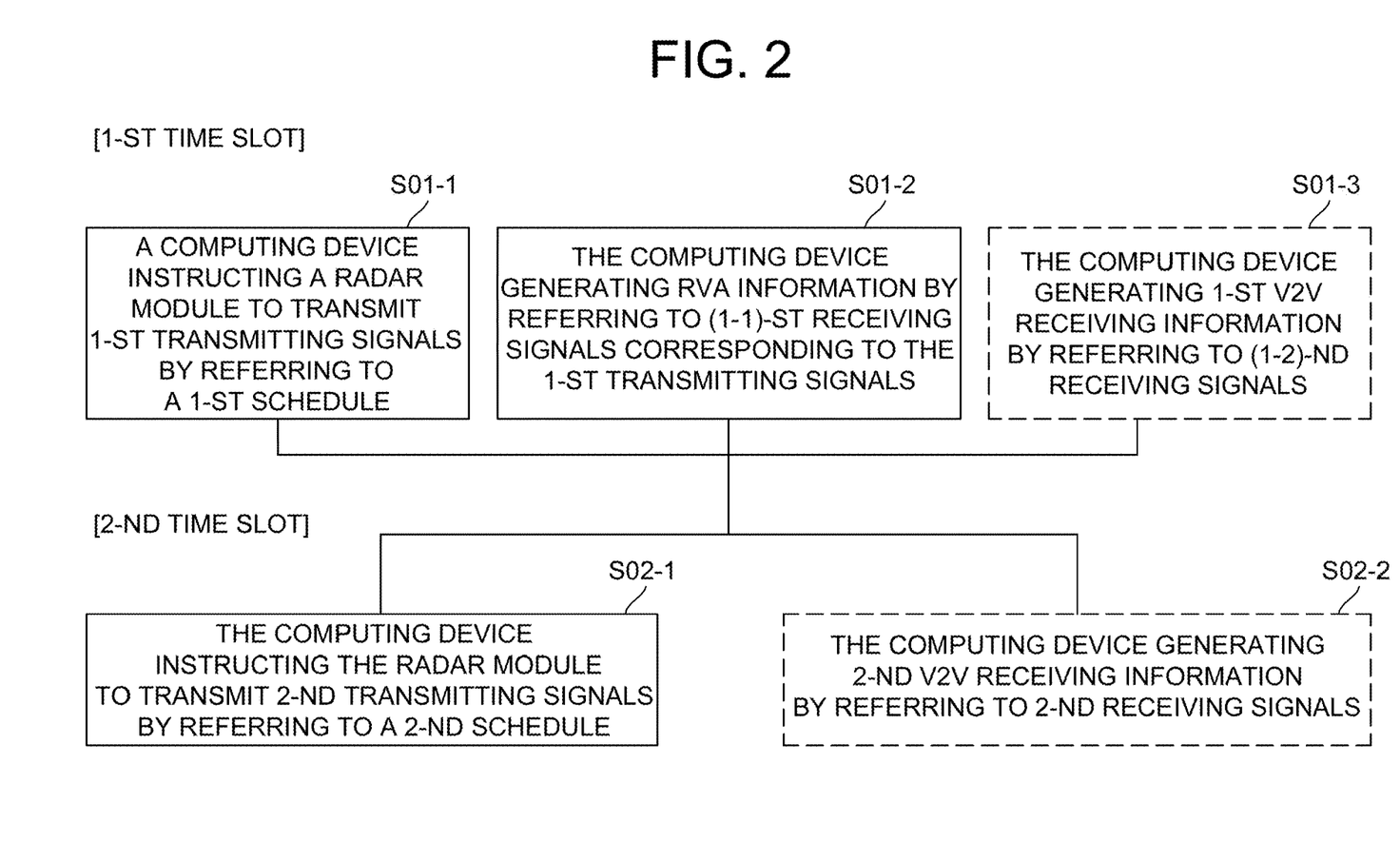
FIG. 2 is a flow chart schematically illustrating the method for the V2V communication by using the radar module used for detecting objects nearby in accordance with one example embodiment of the present disclosure.

FIG. 2 is a flow chart schematically illustrating the method for the V2V communication by using the radar module used for detecting objects nearby in accordance with one example embodiment of the present disclosure.

By referring to FIG. 2, at a step of S01-1, the computing device 100, if a 1-st trigger that a 1-st timing corresponding to a current time is included in a 1-st time slot is detected, may perform a process of instructing the radar module 130 to transmit one or more 1-st transmitting signals, to be used for acquiring the RVA information on 1-st surrounding objects including 1-st surrounding vehicles near the subject vehicle by referring to at least one 1-st schedule. Also, in parallel with the step of S01-1, at a step of S01-2, the computing device 100 may perform a process of generating the RVA information by using one or more (1-1)-st receiving signals, corresponding to the 1-st transmitting signals, acquired through the radar module 130. During the same time slot, i.e., the 1-st time slot, in parallel with said steps of S01-1 and S01-2, a process may be further performed as the case may be. That is, at a step of S01-3, the computing device 100, if one or more (1-2)-nd receiving signals are acquired through the radar module 130 from at least part of the 1-st surrounding objects, may perform a process of generating 1-st V2V receiving information by referring to the (1-2)-nd receiving signals.

Thereafter, at a step of S02-1, if a 2-nd trigger that a 2-nd timing corresponding to a later time from the 1-st timing is included in a 2-nd time slot is detected, the computing device 100 may perform a process of instructing the radar module 130 to transmit one or more 2-nd transmitting signals by referring to at least one 2-nd schedule, corresponding to V2V transmitting information on the subject vehicle. Also, similar to processes performed during the 1-st time slot, during the 2-nd time slot, in parallel with the step of S02-1, a process can be further performed as the case may be. That is, the computing device 100, if one or more 2-nd receiving signals are acquired through the radar module 130 from at least part of 2-nd surrounding vehicles near the subject vehicle at the 2-nd timing, may perform a process of generating 2-nd V2V receiving information on at least part of the 2-nd surrounding vehicles by referring to the 2-nd receiving signals.

So far the V2V communication method of the present disclosure has been explained briefly, below it will be explained more specifically. By performing the method proposed by the present disclosure, two processes, i.e., a process of acquiring the RVA information and a process of performing the V2V communication, can be performed. In this regard, those two processes will be explained separately. Herein, the process of acquiring the RVA information may be performed during the 1-st time slot, and the process of the V2V communication may be mainly performed during the 2-nd time slot, but also can be subsidiarily performed during the 1-st time slot. The reason why a time range should be divided into such time slots will be explained later too. First, the process of acquiring the RVA information will be explained.

Herein, the RVA information may be a kind of information on a range, a velocity and an angle of an object, and may be a basic information which the radar module 130, using Frequency Modulated Continuous Wave (FMCW) signals, can acquire conventionally. Thus, the process of acquiring the RVA information may be similar to that of a prior art. In order to acquire the RVA information, the computing device 100 may instruct the radar module 130 to instruct the radar module 130 to transmit the 1-st transmitting signals to the 1-st surrounding vehicles, i.e., vehicles located closer than a first threshold from the subject vehicle at the first timing. Herein, the 1-st transmitting signals may have been built as chirp signals. And, the 1-st schedule may represent a schedule of transmitting the 1-st transmitting signals in a prescribed frequency during the 1-st time slot. As an example, the 1-st schedule may represent a schedule of transmitting 128 or 256 1-st transmitting signals during the 1-st time slot.

If the 1-st transmitting signals are transmitted to at least part of the 1-st surrounding vehicles, the (1-1)-st receiving signals, as reflected signals of the 1-st transmitting signals, may be acquired through the radar module 130. After the (1-1)-st receiving signals are acquired, the computing device 100 may generate each of one or more Intermediate Frequency (IF) signals between each of the 1-st transmitting signals and each of the (1-1)-st receiving signals, and then apply a Fourier Transform to the IF signals, to thereby generate the RVA information. As said before, such process is similar to that of a conventional FMCW radar scheme, thus above explanation will be sufficient for a person in the art.

Below, the process of the V2V communication will be explained. First, the process can be divided into a transmitting process and a receiving process. Herein, the transmitting process may be performed during the 2-nd time slot, and the receiving process may be performed during both of the 1-st time slot and the 2-nd time slot. Regarding the transmitting process, if the 2-nd trigger that the 2-nd timing corresponding to a later time from the 1-st timing is included in the the 2-nd time slot is detected, the computing device 100 may perform a process of instructing the radar module 130 to transmit the 2-nd transmitting signals by referring to the 2-nd schedule, corresponding to the V2V transmitting information on the subject vehicle.

Herein, the 2-nd schedule may have been acquired by referring to a specific reference data permutation corresponding to a specific circumstance of the subject vehicle and a reference length included in a communication rule of the V2V communication, which is shared among vehicles capable of the V2V communication. Each of reference data permutations, including the specific reference data permutation, may be each of binary permutations which has been prescribed for each of circumstances of an example vehicle. For example, if the example vehicle is in an emergency situation, its corresponding reference data permutation may be 1, 0, 0, 1, 0, 1. Otherwise, if an accident has occurred near the example vehicle, its corresponding reference data permutation may be 1, 0, 0, 0, 1, 1. Herein, a starting signal and an ending signal of each of the reference data permutations may have been set as 1, to tag those as guide bits which makes a detection of the reference data permutations among flows of arbitrary binary signals easier. In the explanations above, it was illustrated that two guide bits are set in each of the reference data permutations, i.e., one in a foremost bit and the other one in a backmost bit, for convenience, but more bits, e.g., two in the front and other two in the back, or three in the front and other three in the back, can be set as the guide bits.

Under an assumption that the reference data permutations are set as shown above, the computing device 100 may, by referring to the 2-nd schedule, transmit the 2-nd transmitting signals in a frequency corresponding to one of the reference data permutations, e.g., the specific reference data permutation. In order to take a look at an example of transmitting the 2-nd transmitting signals, FIG. 3 will be referred to.

Figure 3:
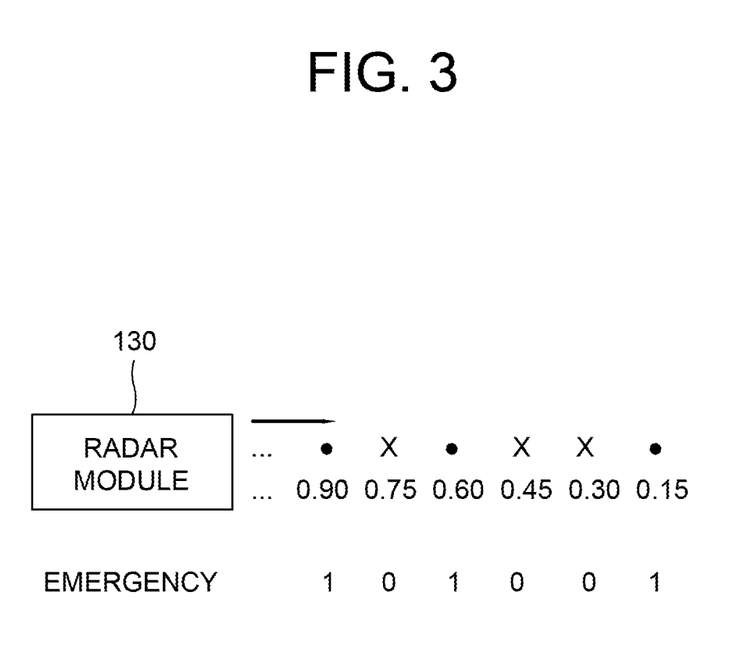
FIG. 3 is a drawing schematically illustrating a process of transmitting second transmitting signals to be used for performing the method for the V2V communication by using the radar module used for detecting objects nearby in accordance with one example embodiment of the present disclosure.

FIG. 3 is a drawing schematically illustrating a process of transmitting second transmitting signals to be used for performing the method for the V2V communication by using the radar module used for detecting objects nearby in accordance with one example embodiment of the present disclosure.

By referring to FIG. 3, it can be seen that the subject vehicle is in the emergency situation, and the reference length is 0.9 sec. In this case, the computing device 100 may transmit the 2-nd transmitting signals in a 0.15 sec timing, a 0.6 sec timing and a 0.9 sec timing. In this way, at least part of the 2-nd surrounding vehicles may receive the 2-nd transmitting signals, to thereby acquire information on the emergency situation of the subject vehicle. If the 2-nd time slot corresponds to 4.5 seconds, the 2-nd transmitting signals can be transmitted for 5 cycles by referring to the 2-nd schedule.

Hereinafter, the receiving process of the V2V communication method will be explained.

When other vehicles transmit signals to the subject vehicle, they just transmit those in their own schedules. Thus, different from the transmitting process performed only during the 2-nd time slot, the receiving process can be performed during both the 1-st time slot and the 2-nd time slot. During the 1-st time slot, in order to perform the receiving process properly, an additional process is necessary. Except that, it is same during the 1-st time slot and the 2-nd time slot. First, the receiving process performed during the 1-st time slot will be explained.

During the 1-st time slot, the (1-1)-st receiving signals, which are the reflected signals of the 1-st transmitting signals, are acquired along with the (1-2)-nd receiving signals, thus a process of distinguishing those two kinds of receiving signals is necessary.

In this regard, if a time gap between receiving timings of its two inputted receiving signals is larger than or same as a second threshold, the computing device 100 may generate two IF signals between one of the 1-st transmitting signals and said two inputted receiving signals. Then, the computing device 100 may determine whether each of center frequencies of each of the IF signals is included in a 1-st frequency range or a 2-nd frequency range, to thereby determine whether each of said inputted receiving signals is included in the (1-1)-st receiving signals or the (1-2)-nd receiving signals. Herein, since the (1-1)-st receiving signals are reflected signals of the 1-st transmitting signals, thus a center frequency of its corresponding IF signal between them may be relatively smaller. More specifically, the (1-1)-st receiving signals and the 1-st transmitting signals will be similar to each other due to their relationship, i.e., original ones and reflected ones, thus the center frequencies of the IF signals, which represents differences between those, may be relatively smaller. However, on the other hand, since the (1-2)-nd receiving signals are not related to the 1-st transmitting signals, a center frequency of its corresponding IF signal between them may be relatively larger. Therefore, on condition that the 1-st frequency range has been set as smaller than the 2-nd frequency range, one of the inputted receiving signals whose corresponding center frequency is included in the 1-st frequency range can be determined as being included in the (1-1)-st receiving signals, and another one of the inputted receiving signals whose corresponding center frequency is included in the 2-nd frequency range can be determined as being included in the 2-nd receiving signals.

Different from this case, if the time gap is smaller than the second threshold, the computing device 100 may not able to distinguish those two by using something similar to said IF signals. Thus, the computing device may just instruct the radar module to continuously acquire receiving signals until a meta data permutation to be explained later is fully generated. As an example, if an interference between two inputted receiving signals is detected so that a proper acquisition of information is failed, a specific receiving signal, which is acquired at a timing later than a time corresponding to the reference length from a timing corresponding to the interference, may be determined as one of the (1-2)-nd receiving signals, to thereby become a component of said meta data permutation.

However, since the process of acquiring the RVA information is more important process to be performed during the 1-st time slot, a frequency interference prevention filter may be used during the 1-st time slot even though it may disturb the process of the V2V communication.

So far the process of preventing an interference between inputted receiving signals has been explained. Below, a process of generating the 1-st V2V receiving information by using the (1-2)-nd receiving signals will be explained. If the (1-2)-nd receiving signals are acquired as shown above, the computing device 100 may find at least one starting signal and at least one ending signal among the (1-2)-nd receiving signals by referring to the reference length, and then generate the meta data permutation including at least part of the (1-2)-nd receiving signals between the starting signal and the ending signal. Thereafter, the computing device 100 may compare the meta data permutations and said reference data permutations and may find a specific reference data permutation whose similarity score is larger than a third threshold, to thereby acquire the 1-st V2V receiving information corresponding to the specific reference data permutation, and then to thereby acquire the 1-st circumstance information by using the 1-st V2V receiving information. In order to take a look at an example of said process, FIG. 4 will be referred to.

Figure 4:
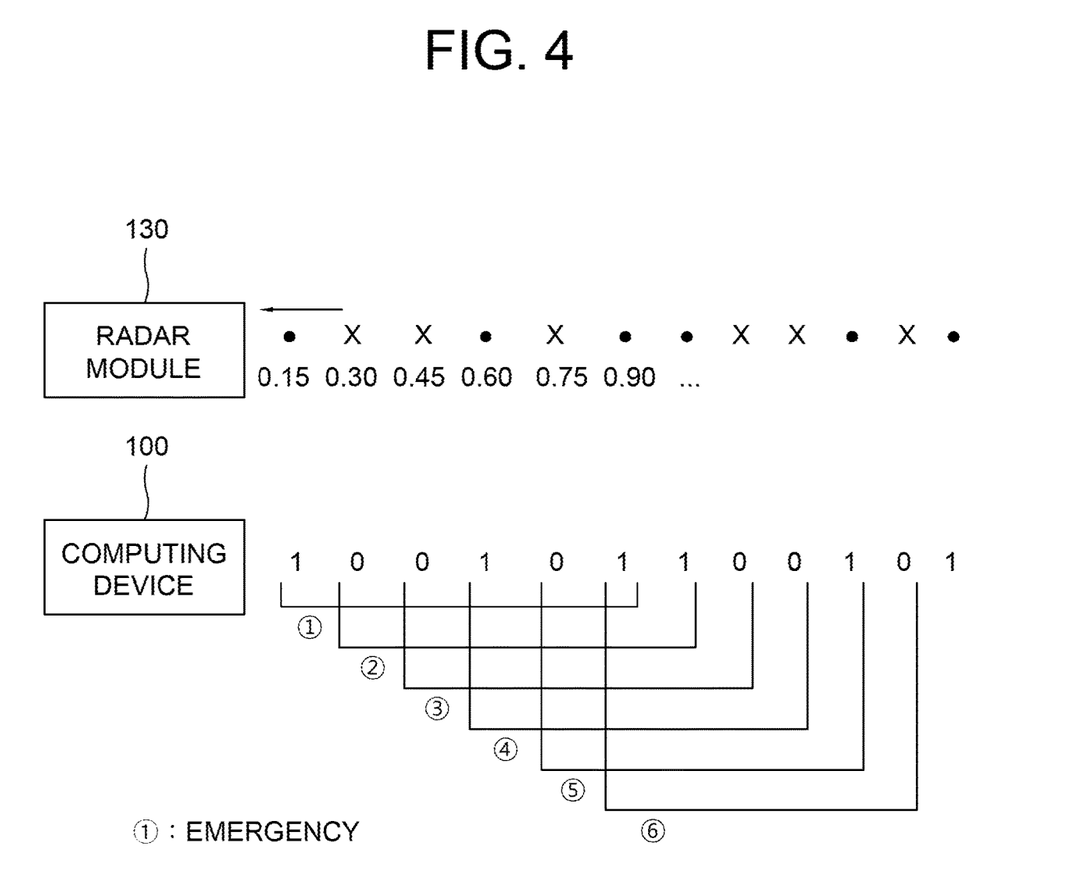
FIG. 4 is a drawing schematically illustrating a process of acquiring first circumstance information from first V2V receiving information acquired by using first receiving signals inputted at a first timing in a first time slot, to be used for performing the method for the V2V communication by using the radar module used for detecting objects nearby in accordance with one example embodiment of the present disclosure.

FIG. 4 is a drawing schematically illustrating a process of acquiring the 1-st circumstance information from the 1-st V2V receiving information acquired by using first receiving signals inputted at the 1-st timing in the 1-st time slot, to be used for performing the method for the V2V communication by using the radar module used for detecting objects nearby in accordance with one example embodiment of the present disclosure.

By referring to FIG. 4, an example of the (1-2)-nd receiving signals, which are noted as 1, 0, 0, 1, 0, 1, 1, 0, 0, 1, 0, 1, 1, 0, 0, 1, 0, 1, acquired by the computing device 100 may be seen. If it is known that the reference length is 6, the computing device 100 may find two 1s whose gap is 6, and may determine those two 1s as the starting signal and the ending signal. And, the computing device 100 may determine the meta data permutation 1, 0, 0, 1, 0, 1 including some of the (1-2)-nd signals, i.e., 0, 0, 1, 0 between said two 1s. Herein, since the meta data permutation, as an example, is same as said specific reference permutation indicating the emergency situation, the computing device 100 may acquire the 1-st circumstance information representing that a danger is present around a vehicle which transmitted the (1-2)-nd receiving signals.

Also in timings included in the 2-nd time slot, the computing device 100 may be able to generate 2-nd V2V receiving information on at least part of the 2-nd surrounding vehicles located closer than said first threshold from the subject vehicle by using said one or more 2-nd receiving signals, and then generate the 2-nd circumstance information by using the 2-nd V2V receiving information. Such process will be similar to that illustrated in FIG. 4, but said process of distinguishing two inputted receiving signals will not be performed, and said frequency interference prevention filter may not be used. Said process of distinguishing is not necessary because no reflected signals are acquired during the 2-nd time slot, and the frequency interference prevention filter is not necessary because it is a component for just acquiring the RVA information.

After the 1-st circumstance information and the 2-nd circumstance information are acquired, the computing device 100 may support the autonomous driving of the subject vehicle by using those. That is, during the 1-st time slot, the computing device 100 may generate the 1-st circumstance information on at least part of the 1-st surrounding vehicles by referring to the 1-st V2V receiving information, and then support the autonomous driving of the subject vehicle by using the 1-st circumstance information. Also, during the 2-nd time slot, the computing device 100 may generate the 2-nd circumstance information on at least part of the 2-nd surrounding vehicles by referring to the 2-nd V2V receiving information, and then support the autonomous driving of the subject vehicle by using the 2-nd circumstance information.

Herein, among the 2-nd circumstance information, (2-1)-st circumstance information on one or more specific vehicles included in both of the 1-st surrounding vehicles and the 2-nd surrounding vehicles may be acquired by updating at least part of the 1-st circumstance information on the specific vehicles, using at least part of the 2-nd V2V receiving information. It is possible because the 1-st time slot and the 2-nd time slot are located in serial and sizes of the two are not so large, thus there may be many duplicated ones included in both of the 1-st surrounding vehicles and the 2-nd surrounding vehicles. And, among the 2-nd circumstance information, (2-2)-nd circumstance information on other vehicles of the 2-nd surrounding vehicles other than the specific vehicles may be acquired from scratch by using another part of the 2-nd V2V receiving information, not like the (2-1)-st circumstance information which is not acquired from scratch but acquired by updating the 1-st circumstance information. Said other vehicles are relatively new ones comparing to the specific vehicles, thus such process will be very natural.

The 1-st time slot and the 2-nd time slot may be set in serial, alternatively. That is, first 4.5 sec range may be the 1-st time slot, and its next 4.5 sec range after that may be the 2-nd time slot. Then, again 4.5 sec range after that may be the 1-st time slot, and so on. During each of the time slots, each of said processes for each of the time slots may be performed, and the computing device 100 may be able to acquire the RVA information and the circumstance information continuously and transmit its V2V transmitting information to other vehicles, to thereby acquire a safer autonomous driving.

It is a positive effect of the present disclosure to provide a method for the V2V communication through the radar module using the FMCW signals without additional cost. And, it is still another positive effect of the present disclosure to allow the radar module to perform the V2V communication while performing its original functions, by transmitting different signals according to time slots. Finally, it is still yet another positive effect of the present disclosure to establish the V2V communication by allowing each of vehicles to share its own circumstance information with other vehicles, using prescribed data permutations.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for a vehicle-to-vehicle (V2V) communication using a radar module to communicate with objects nearby, comprising steps of:
(a) a computing device, if a 1-st timing corresponding to a current time is detected to be included in a 1-st time slot, as a 1-st trigger, performing (i) a process of instructing the radar module to transmit one or more 1-st outgoing signals, to acquire information on at least part of one or more head directions, one or more relative locations and one or more relative velocities of at least part of one or more 1-st surrounding objects including one or more 1-st surrounding vehicles located closer than a first threshold from a subject vehicle in communication with the computing device at the 1-st timing, by using at least one 1-st schedule and (ii) a process of generating the information by using one or more (1-1)-st receiving incoming signals, corresponding to the 1-st outgoing signals, acquired through the radar module; and
(b) the computing device, if a 2-nd timing corresponding to a later time from the 1-st timing is detected to be included in a 2-nd time slot, as a 2-nd trigger, performing a process of instructing the radar module to transmit one or more 2-nd outgoing signals corresponding to information on the subject vehicle by using at least one 2-nd schedule.

2. The method of claim 1, wherein, at the step of (a), the computing device, if one or more (1-2)-nd incoming signals are acquired through the radar module from at least part of the 1-st surrounding objects, further performs a process of generating 1-st V2V incoming information by using the (1-2)-nd incoming signals in parallel with the other processes performed during the step of (a), and
wherein, at the step of (b), the computing device, if one or more 2-nd incoming signals are acquired through the radar module from at least part of 2-nd surrounding vehicles which are located closer than the first threshold from the subject vehicle at the 2-nd timing, performs a process of generating 2-nd V2V incoming information on at least part of the 2-nd surrounding vehicles by using the 2-nd incoming signals in parallel with the other process performed during the step of (b).

3. The method of claim 2, wherein, at the step of (a), the computing device (i) detects at least one starting signal and at least one ending signal among the (1-2)-nd incoming signals by using a reference length included in a communication rule of the V2V communication, (ii) generates at least one metadata permutation including at least part of the (1-2)-nd incoming signals between the starting signal and the ending signal, and then (iii) generates the 1-st V2V incoming information by using the metadata permutation.

4. The method of claim 3, wherein, at the step of (a), the computing device, if a time gap between receiving timings of its two inputted incoming signals is smaller than a second threshold and thus if the inputted incoming signals are not determined as being included in the (1-1)-st incoming signals or as being included in the (1-2)-nd incoming signals, instructs the radar module to continuously receive incoming signals until the metadata permutation is generated.

5. The method of claim 3, wherein, at the step of (a), the computing device compares the metadata permutation and each of one or more reference data permutations corresponding to each of driving circumstances, to find a specific reference data permutation whose similarity score with the metadata permutation is larger than a third threshold, to thereby generate the 1-st V2V incoming information by using information on a specific driving circumstance corresponding to the specific reference data permutation.

6. The method of claim 2, wherein, at the step of (a), the computing device generates 1-st circumstance information on at least part of the 1-st surrounding vehicles by using the 1-st V2V incoming information, to thereby support an autonomous driving of the subject vehicle by using the 1-st circumstance information, and
wherein, at the step of (b), the computing device generates 2-nd circumstance information on at least part of the 2-nd surrounding vehicles by using the 2-nd V2V incoming information, to thereby support the autonomous driving of the subject vehicle by using the 2-nd circumstance information,
wherein (2-1)-st circumstance information among the 2-nd circumstance information is acquired by updating at least part of the 1-st circumstance information on one or more specific vehicles included in both of the 1-st surrounding vehicles and the 2-nd surrounding vehicles, using at least part of the 2-nd V2V incoming information thereon, and
wherein (2-2)-nd circumstance information on another vehicles among the 2-nd surrounding vehicles other than the specific vehicles is acquired by another part of the 2-nd V2V incoming information.

7. The method of claim 2, wherein, at the step of (b), the computing device transmits the 2-nd outgoing signals with its transmitting timings determined by using the 2-nd schedule to thereby deliver the information on the subject vehicle to at least part of the 2-nd surrounding vehicles, wherein the 2-nd schedule has been acquired by using a specific reference data permutation corresponding to the information on the subject vehicle among each of one or more reference data permutations for each of driving circumstances and a reference length included in a communication rule of the V2V communication.

8. The method of claim 2, wherein, at the step of (a), the computing device, if a time gap between receiving timings of its two inputted incoming signals is larger than or same as a second threshold, (i) generates Intermediate Frequency (IF) signals between one of the 1-st outgoing signals and said inputted incoming signals, (ii) determines whether each of center frequencies of each of the IF signals is included in a 1-st frequency range or is included in a 2-nd frequency range, to thereby determine whether each of said inputted incoming signals is included in the (1-1)-st incoming signals or the (1-2)-nd incoming signals.

9. The method of claim 2, wherein the computing device uses a frequency interference prevention filter to acquire the (1-1)-st incoming signals and the (1-2)-nd incoming signals at a timing included in the 1-st time slot, and
wherein the computing device does not use the frequency interference prevention filter to acquire the 2-nd incoming signals at a timing included in the 2-nd time slot.

10. The method of claim 1, wherein, at the step of (a), as the computing device instructs the radar module to transmit the 1-st outgoing signals built as chirp signals, the computing device (i) acquires the (1-1)-st incoming signals, which are reflected signals of the 1-st outgoing signals, through the radar module, (ii) generates each of one or more Intermediate Frequency (IF) signals between each of the 1-st outgoing signals and each of the (1-1)-st incoming signals, and (iii) generates the information by applying a Fourier transform to the IF signals.

11. A computing device for performing a vehicle-to-vehicle (V2V) communication using a radar module that communicates with objects nearby, the computing device comprising:
at least one memory that stores instructions; and
at least one processor configured to execute the instructions to perform processes of: (I) if a 1-st timing corresponding to a current time is detected to be included in a 1-st time slot, as a 1-st trigger,
(i) instructing the radar module to transmit one or more 1-st outgoing signals, to acquire information on at least part of one or more head directions, one or more relative locations and one or more relative velocities of at least part of one or more 1-st surrounding objects including one or more 1-st surrounding vehicles located closer than a first threshold from a subject vehicle in communication with the computing device at the 1-st timing, by using at least one 1-st schedule and (ii) generating the information by using one or more (1-1)-st incoming signals, corresponding to the 1-st outgoing signals, acquired through the radar module; and (II) if a 2-nd trigger that a 2-nd timing corresponding to a later time from the 1-st timing is included in a 2-nd time slot is detected, instructing the radar module to transmit one or more 2-nd outgoing signals by using at least one 2-nd schedule.

12. The computing device of claim 11, wherein, at the process of (I), the processor, if one or more (1-2)-nd incoming signals are acquired through the radar module from at least part of the 1-st surrounding objects, further performs a process of generating 1-st V2V incoming information by using the (1-2)-nd incoming signals in parallel with the process of (I), and
wherein, at the process of (II), the processor, if one or more 2-nd incoming signals are acquired through the radar module from at least part of 2-nd surrounding vehicles which are located closer than the first threshold from the subject vehicle at the 2-nd timing, performs a process of generating 2-nd V2V incoming information on at least part of the 2-nd surrounding vehicles by using the 2-nd incoming signals in parallel with the process of (II).

13. The computing device of claim 12, wherein, at the process of (I), the processor (i) detects at least one starting signal and at least one ending signal among the (1-2)-nd incoming signals by using a reference length included in a communication rule of the V2V communication, (ii) generates at least one metadata permutation including at least part of the (1-2)-nd incoming signals between the starting signal and the ending signal, and then (iii) generates the 1-st V2V incoming information by using the metadata permutation.

14. The computing device of claim 13, wherein, at the process of (I), the processor, if a time gap between receiving timings of its two inputted incoming signals is smaller than a second threshold so that the inputted incoming signals cannot be distinguished as being included in the (1-1)-st incoming signals or the (1-2)-nd incoming signals, instructs the radar module to continuously receive incoming signals until the metadata permutation is generated.

15. The computing device of claim 13, wherein, at the process of (I), the processor compares the metadata permutation and each of one or more reference data permutations corresponding to each of driving circumstances, to find a specific reference data permutation whose similarity score with the metadata permutation is larger than a third threshold, to thereby generate the 1-st V2V incoming information by using information on a specific driving circumstance corresponding to the specific reference data permutation.

16. The computing device of claim 12, wherein, at the process of (I), the processor generates 1-st circumstance information on at least part of the 1-st surrounding vehicles by using the 1-st V2V incoming information, to thereby support an autonomous driving of the subject vehicle by using the 1-st circumstance information, and
wherein, at the process of (II), the processor generates 2-nd circumstance information on at least part of the 2-nd surrounding vehicles by using the 2-nd V2V incoming information, to thereby support the autonomous driving of the subject vehicle by using the 2-nd circumstance information,
wherein (2-1)-st circumstance information among the 2-nd circumstance information is acquired by updating at least part of the 1-st circumstance information on one or more specific vehicles included in both of the 1-st surrounding vehicles and the 2-nd surrounding vehicles, using at least part of the 2-nd V2V incoming information thereon, and
wherein (2-2)-nd circumstance information on another vehicles among the 2-nd surrounding vehicles other than the specific vehicles is acquired by another part of the 2-nd V2V incoming information.

17. The computing device of claim 12, wherein, at the process of (II), the processor transmits the 2-nd outgoing signals with its transmitting timings determined by using the 2-nd schedule to thereby deliver the information on the subject vehicle to at least part of the 2-nd surrounding vehicles, wherein the 2-nd schedule has been acquired by using a specific reference data permutation corresponding to the information on the subject vehicle among each of one or more reference data permutations for each of driving circumstances and a reference length included in a communication rule of the V2V communication.

18. The computing device of claim 12, wherein, at the process of (I), the processor, if a time gap between receiving timings of its two inputted incoming signals is larger than or same as a second threshold, (i) generates Intermediate Frequency (IF) signals between one of the 1-st outgoing signals and said inputted incoming signals, (ii) determines whether each of center frequencies of each of the IF signals is included in a 1-st frequency range or is included in a 2-nd frequency range, to thereby determine whether each of said inputted incoming signals is included in the (1-1)-st incoming signals or the (1-2)-nd incoming signals.

19. The computing device of claim 12, wherein the processor uses a frequency interference prevention filter to acquire the (1-1)-st incoming signals and the (1-2)-nd incoming signals at a timing included in the 1-st time slot, and
wherein the processor does not use the frequency interference prevention filter to acquire the 2-nd incoming signals at a timing included in the 2-nd time slot.

20. The computing device of claim 11, wherein, at the process of (I), as the processor instructs the radar module to transmit the 1-st outgoing signals built as chirp signals, the processor (i) acquires the (1-1)-st incoming signals, which are reflected signals of the 1-st outgoing signals, through the radar module, (ii) generates each of one or more Intermediate Frequency (IF) signals between each of the 1-st outgoing signals and each of the (1-1)-st incoming signals, and (iii) generates the information by applying a Fourier transform to the IF signals.

* * * * *